United States Patent [19]

Preiswerk et al.

[11] Patent Number: 4,552,562

[45] Date of Patent: Nov. 12, 1985

[54] PROCESS FOR PREVENTING THE GELATION OF CONCENTRATED AQUEOUS PHOTOACTIVATOR SOLUTIONS

[75] Inventors: Werner Preiswerk, Binningen; Beat Bruttel, Böckten, both of Switzerland

[73] Assignee: Ciba Geigy Corporation, Ardsley, N.Y.

[21] Appl. No.: 590,929

[22] Filed: Mar. 19, 1984

[30] Foreign Application Priority Data

Mar. 25, 1983 [CH] Switzerland .................. 1641/83

[51] Int. Cl.$^4$ .................. C09B 47/20; C11D 3/39; D06L 3/12; C08J 5/22
[52] U.S. Cl. .................. 8/101; 8/103; 8/137; 252/301.16; 252/301.21; 260/245.82; 260/245.86
[58] Field of Search .................. 8/101, 103, 137

[56] References Cited

U.S. PATENT DOCUMENTS

| | | | |
|---|---|---|---|
| 3,927,967 | 12/1975 | Speakman | 8/103 |
| 4,033,718 | 7/1977 | Holcombe et al. | 8/103 |
| 4,166,718 | 9/1979 | Reinert et al. | 8/111 |
| 4,247,401 | 1/1981 | Bloch et al. | 210/638 |
| 4,390,342 | 6/1983 | Bruttel et al. | 8/524 |
| 4,394,125 | 7/1983 | Holzle et al. | 8/103 |
| 4,405,329 | 9/1983 | Abel et al. | 8/527 |
| 4,456,452 | 6/1984 | Holzle et al. | 8/103 |
| 4,466,900 | 8/1984 | Horlacher et al. | 252/301.23 |

FOREIGN PATENT DOCUMENTS

| | | |
|---|---|---|
| 41240 | 12/1981 | European Pat. Off. |
| 59782 | 9/1982 | European Pat. Off. |
| 369281 | 6/1982 | South Africa |
| 673081 | 10/1982 | South Africa |
| 1359898 | 7/1974 | United Kingdom |
| 1504261 | 3/1978 | United Kingdom |
| 2015018 | 9/1979 | United Kingdom |
| 2058798 | 4/1981 | United Kingdom |
| 2058798 | 4/1981 | United Kingdom |
| 2106420 | 4/1983 | United Kingdom |
| 2108406 | 5/1983 | United Kingdom |
| 2107606 | 5/1983 | United Kingdom |

OTHER PUBLICATIONS

Chemical Abstract, vol. 95, (1981), 117056.

*Primary Examiner*—A. Lionel Clingman
*Attorney, Agent, or Firm*—Edward McC. Roberts; Kevin T. Mansfield

[57] ABSTRACT

The invention relates to a process for preventing the gelation of concentrated aqueous photoactivator solutions containing sulfonated zinc or aluminium phthalocyanines. The process comprises passing a crude solution containing these compounds, when preparing the solutions, through a semipermeable asymmetrical membrane having a pore diameter of 1 to 500 Å. This membrane consists of a basic structure of cellulose acetate, polyacrylonitrile or a copolymer of acrylonitrile and other ethylenically unsaturated monomers. This basic structure is modified in specific manner with ionic groups. The concentrated photoactivator solutions so obtained have excellent storage stability, do not gel, and contain exceedingly small amounts of inorganic and organic impurities.

14 Claims, No Drawings

PROCESS FOR PREVENTING THE GELATION OF CONCENTRATED AQUEOUS PHOTOACTIVATOR SOLUTIONS

The present invention relates to a process for preventing the gelation of concentrated aqueous photoactivator solutions which contain sulfonated zinc and/or aluminium phthalocyanines as photoactivators, and also to the non-gelling, concentrated, storage-stable aqueous solutions so obtained.

Sulfonated zinc and aluminium phthalocyanines are known to be excellent photoactivators which are used principally as photobleaching agents and also, where appropriate, as microbicides. Reference is made in this connection to the following publications: U.S. Pat. Nos. 3,927,967, 4,094,806, 4,033,718, 4,256,597, 4,256,598, 4,318,883, 416,718, 4,311,605, and European published patent application 47 716. These sulfonated zinc and aluminium phthalocyanines are used e.g. as bleach photoactivators in various detergents.

Up to now it has proved extremely difficult to prepare suitable physical forms of the photoactivators referred to above. The sulfonated phthalocyanines are usually obtained from the synthesis in comparatively impure form. As a rule they contain up to 30% of organic and inorganic byproducts. These latter substances are mainly salts which as NaCl and $Na_2SO_4$. The organic byproducts comprise a wide range of compounds, some of which have not yet been identified, for example in a concentration of up to 15%. These byproducts are highly undesirable, as they could impair for example the effectiveness of the photoactivator. Efforts have been made to separate these byproducts by chemical means, but the results were not entirely satisfactory. The aqueous solutions so obtained still did not contain the photoactivator in the desired high concentration and were also not sufficiently storage-stable. A further shortcoming of these liquid formulations was that they often gelled, i.e. their viscosity increased, so that they were scarcely pourable. This problem arose in particular with sulfonated aluminium phthalocyanine.

Accordingly, it is the object of the present invention to find a method of preparing a liquid aqueous physical form of the cited photoactivators which does not have the shortcomings discussed above. In particular, it is the object of the present invention to provide a process by means of which it is possible to prevent, or at least to diminish, the gelation of the liquid aqueous physical form. In addition, the liquid physical form shall contain the photoactivator in as high a concentration as possible, have the property of being storage-stable over a prolonged period of time, and contain as few organic impurities and inorganic salts as possible.

Surprisingly, it has been found that this object is accomplished by passing an unpurified solution of the photoactivators through a specific semipermeable asymmetrical membrane when preparing the photoactivator solutions.

Membrane separation processes are known e.g. from German Offenlegungsschrift specifications 22 04 725, 28 05 891 and 29 48 292. European patent application 59 782 describes a process for the preparation of aqueous dye formulations, in particular of formulations containing reactive dyes, by means of a membrane separation process in which formulation assistants are added to said formulations.

In none of the cited publications is it described or suggested that it is possible to obtain, by the process of this invention, nongelling photoactivator solutions which, surprisingly, contain extremely few byproducts (compared with the dye solutions of the prior art) and which, also surprisingly, have better storage stability.

The process of this invention for preventing the gelation of concentrated aqueous photoactivator solutions which contain sulfonated and/or aluminium phthalocyanines comprises passing a crude solution containing said photoactivators, when preparing said concentrated solutions, through a semipermeable asymmetrical membrane having a pore diameter of 1 to 500 Å and consisting of a cellulose acetate basic structure which is modified by reaction with an ionic compound which contains reactive groups, or which consists of a basic structure which contains polyacrylonitrile of a copolymer of acrylonitrile and other ethylenically unsaturated monomers, and which is modified by reaction with hydroxylamine and subsequent reaction with a polyfunctional monomer, a polyfunctional polymer, and an ionic compound which contains reactive groups.

The semipermeable membraness suitable for use in the process of this invention shall be able to retain higher molecular substances while ensuring a high rate of flow of water and dissolved compounds having a low molecular weight, e.g. salts such as sodium chloride, sodium sulfate, potassium chloride, ammonium sulfate, sodium phosphate, potassium sulfate, sodium acetate or low molecular impurities, e.g. unreacted or partially decomposed starting materials. However, they should also be able to separate differently charged ions.

The retention or separation (cut-off level) is determined by the molecular weight and/or the ionic charge. This so-called membrane hyperfiltration is also called reverse osmosis and is related to ultrafiltration. This term will be understood as meaning separation procedures in the molecular range.

The membranes employed in the process of this invention are semipermeable, ionic asymmetrical membranes having a pore diameter of 1 to 500 Å. They have a cut-off level in the range for example from 300 to 500. Membranes with a cut-off level of 400 to 500 are particularly suitable for the process of this invention. They allow water and dissolved substances whose molecular weight is below the cut-off level to pass through at high rates per unit of area and at low to medium pressure. Pressures of e.g. 10 to 100 bar, preferably of 10 to 30 bar and, most preferably, of 20 to 30 bar are applied in the process of the invention. The pressure may be applied e.g. by means of a pump.

In a single passage through the membrane, the degree of demineralisation, without loss of photoactivator, can be up to 70% and more. Moreover, the volume of the solution of the retained substances (in the concentrate) decreases correspondingly and the concentration of the retained portion increases. If a further reduction of the low molecular constituents is desired, this may be accomplished without difficulty after conveniently diluting the retained solution or suspension with water to the initial volume by repeating the process once or more than once. The separation may also be carried out continuously by adapting the rate of addition of water to that of the decrease in the permeate.

The membranes suitable for use in the process of the invention have a basic structure of cellulose acetate, polyacrylonitrile or a copolymer of acrylonitrile and other ethylenically unsaturated monomers, said basic structure being modified in the manner described above. In practice, membranes based on cellulose acetate have proved advantageous.

Suitaable reactive reagents containing an ionisable group are colourless and coloured compounds, for example ionic reactive dyes which may belong to different classes such as anthraquinone, azo or formazane dyes. Suitable colourless compounds are, for example, derivatives of 4,4'-diaminostilbene-2,2'-disulfonic acid, for example 4,4'-bis-(4'',6''-dichlorotriazin-2''-yl)-aminostilbene-2,2'-disulfonic acid and similar compounds. Typical examples of reactive groups which make it possible to attach these reagents to the starting polymers are: carboxylic acid halide groups, sulfinic acid halide groups, radicals of $\alpha,\beta$-unsaturated carboxylic acids or amides, for example radicals of acrylic, methacrylic, $\alpha$-chloroacrylic or $\alpha$-bromoacrylic acid, acrylamide radicals, radicals of, preferably, lower haloalkylcarboxylic acids, for example radicals of chloroacetic acid, $\alpha,\beta$-dichloropropionic acid or $\alpha,\beta$-dibromopropionic acid; radicals of fluorocyclobutanecarboxylic acids, for example radicals of trifluorocyclobutanecarboxylic or tetrafluorocyclobutanecarboxylic acid; radicals containing vinylacyl groups, for example vinylsulfonyl groups or carboxyvinyl groups; radicals containing ethylsulfonyl groups ($-SO_2CH_2CH_2OSO_2OH$ or $-SO_2CH_2CH_2Cl$) or ethylaminosulfonyl groups ($-SO_2NHCH_2CH_2OSO_2OH$) and halogenated heterocyclic radicals, for example radicals of dihaloquinoxalines, dihalopyridazones, dihalophthalazines, halobenzthiazoles or, preferably, halogenated pyridines or 1,3,5-triazines, for example radicals of monohalotriazines, dihalotriazines, 2,4-dihalopyrimidines or 2,5,6-trihalopyrimidines. Suitable halogen atoms in the above radicals are fluorine, bromine and, in particular, chlorine atoms.

Examples of suitable ionisable groups are sulfato groups, sulfonic acid groups, sulfonamide groups, carboxylic acid groups, carboxamide groups, hydroxyl groups, thiol groups, isocyanate and/or thioisocyanate groups, ammonium groups formed from primary, secondary or tertiary amino groups and hydrogen, or quaternary ammonium groups, and also phosphonium or sulfonium groups. Preferred reactive compounds (reactive dyes) are those containing sulfonic acid, carboxylic acid or ammonium groups.

Particularly advantageous results are obtained in some cases using compounds containing sulfonic acid groups.

Particularly useful and versatile polymer membranes are those which are modified by an azo dye which contains sulfonic acid groups. The azo dye may also contain a complexed metal, e.g. copper. Membranes obtained from (partially acetylated) cellulose acetate may be modified e.g. by direct reaction with the reactive ionic compounds previously referred to, especially anionic reactive dyes. Such membranes are described e.g. in U.S. Pat. No. 4,247,401.

A further modification of cellulose acetate may be effected e.g. by chemical reaction (in the indicated sequence) with: (1) a polyfunctional monomer containing at least two functional groups (e.g. cyanuric chloride); (2) a polyfunctional oligomer or polymer (e.g. polyethyleneimine); and (3) an ionic compound (e.g. ionic reactive dye which contains reactive groups and ionic groups of the kind indicated above). Such modified cellulose acetate membranes are described e.g. in European published patent application 26 399.

The polyfunctional monomer preferably contains at least two functional groups. Examples of suitable compounds are cyclic carbonimide halides, isocyanates, isothiocyanates or N-methylol compounds, with halodiazines or halotriazines, e.g. cyanuric halides, preferably cyanuric chloride, or tri- or tetrahalopyrimidines, preferably tetrachloropriidine, being particularly suitable.

The polyfunctional oligomers or polymers preferably contain aliphatic or aromatic amino, hydroxyl, thiol, isocyanate and/or isothiocyanate groups. Suitable polyfunctional polymers are e.g. polyethyleneimine, polyvinyl alcohol, cellulose derivatives, polyvinylamine or polyvinyl aniline, with polyethyleneimine being preferred. The membrane preferably contains, as ionic groups, sulfonic acid, carboxylic acid or ammonium groups. Membranes which contain the radicals of an anionic reactive dye are particularly advantageous.

Membranes consisting of a basic structure which contains polyacrylonitrile or a copolymer of acrylonitrile and other ethylenically unsaturated monomers are described e.g. in European published patent application 25 973. The preparation of modified membranes of this type which can be used in the process of this invention is described in U.K. published patent application 2 058 798. The basic structure of the membrane is reacted with hydroxylamine (introduction of amidoxime groups) and then modified in the same manner as the cellulose acetate membranes in European published patent application 26 399.

The content of acrylonitrile units in the basic structure of the membrane is advantageously at least 5% by weight and preferably at least 20% by weight. Preferred are copolymers of acrylonitrile and vinyl acetate, vinyl ethers, vinyl pyridine, vinyl chloride, styrene, butadiene, acrylic acid, methacrylic acid, maleic anhydride, 2-aminomethylmethacrylate or allyl compounds or also terpolymers or tetrapolymers of acrylonitrile.

The so modified membranes may also in addition be subjected to a heat treatment ("tempering"), by means of which the pore size of the membrane skin is substantially determined. The membrane is treated e.g. for 1 to 30 minutes at a temperature in the range from 60° to 90° C., conveniently by immersing it in warm water. If appropriate, the heat treatment may also be carried out before the reaction with the reactive compound which contains ionisable groups. Further, the reaction may also be carried out before the polymeric material is processed to the asymmetrical membrane.

The membranes may be in different forms, e.g. discshaped, lamellar, tube-shaped, or in the form of a bag, cone or hollow fibers. In order to use them effectively for the separation of organic and inorganic substances, it is necessary to integrate them into appropriate systems (modules) and to incorporate them into units (for pressure permeation).

The pore size can be varied by graduated tempering within the temperature range indicated above. The mean charge density (equal to the content of ionisable groups) of the membrane will conveniently be 1 to 100 milliequivalents per kg of dry membrane. The aqueous solutions prepared according to this invention contain zinc or aluminium phthalocyanines, or mixtures thereof, as photoactivators. Preferred photoactivators are sulfonated phthalocyanines of the formula

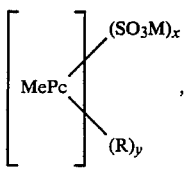

wherein MePc is the zinc or aluminium phthalocyanine ring system, M is hydrogen, an alkali metal ion or an ammonium ion, R is fluorine, chlorine, bromine or iodine, x is any value from 1.3 to 4 and y is any value from 0 to 4, with the proviso that substituents R in the molecule may be identical or different, or mixtures thereof.

It is particularly preferred to prepare concentrated, non-gelling liquid formulations of phthalocyanine photoactivators of the formula

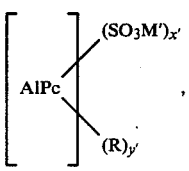

wherein AlPc is the aluminium phthalocyanine ring system, M' is hydrogen, sodium or potassium, x' is any value from 2 to 4 and y' is any value from 0 to 1.5; and those of the formula

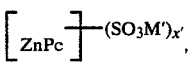

wherein ZnPc is the zinc phthalocyanine ring system, M' is hydrogen, sodium or potassium and x' is any value from 2 to 4.

The sulfonated aluminium and zinc phthalocyanines are obtained from the synthesis as crude solutions or dispersions or as filter cakes which, in addition to water, contain up to about 20% of organic by-products (starting materials, decomposition products etc.) and also up to about 20% of neutral salts (electrolytes). These last mentioned substances originate mainly from the neutralisation and/or from salting out the phthalocyanine sulfonates from the synthesis solution. Such salts are e.g. alkali metal and alkaline earth metal salts such as ammonium, magnesium, sodium or potassium chloride and the corresponding sulfates or hydrogen, sulfates, in particular sodium sulfate and, most particularly, sodium chloride. The process of the invention is carried out by passing the reaction mixture obtained direct in the synthesis, or an aqueous suspension of the moist filter cake referred to above, or of the already dried product, through the semipermeable membrane in the manner described above.

The aqueous photoactivator solutions (liquid formulations) obtainable by the process of the invention likewise constitute an object of the invention. They contain exceedingly small amounts of organic and inorganic impurities and a high concentration of photoactivator. They have excellent storage stability and do not gel even during prolonged storage.

Non-gelling, concentrated, storage-stable aqueous photoactivator solutions (formulations) of the invention contain e.g. from 5 to 50% by weight of one or more sulfonated aluminium and/or zinc phthalocyanines, in particular those of the formula (1), 0.05 to 1% by weight of neutral salts, in particular NaCl and Na$_2$SO$_4$, and 0.05 to 2% by weight of organic by-products.

Preferred photoactivator solutions contain 10 to 35% by weight of a sulfonated phthalocyanine of the formula (1), preferably of the formula (2) or (3), 0.01 to 0.2% by weight of NaCl, 0.1 to 0.8% by weight of Na$_2$SO$_4$ and 0.1 to 1% by weight of organic by-products.

In the following Examples parts and percentages are by weight, unless otherwise indicated.

EXAMPLES FOR THE PREPARATION OF PREFERRED MEMBRANES SUITABLE FOR USE IN THE PROCESS OF THE INVENTION

A. According to Example 1 of U.S. Pat. No. 4,247,401:

A solution is prepared from 25 g of cellulose acetate (degree of acetylation=39.8%), 45 g of acetone and 30 g of formamide. This solution is allowed to stand for 3 days, then poured onto a glass plate on which it is coated with a spatula to a thickness of 0.6 mm. The solvent is allowed to evaporate for 5 seconds at 25° C., then the glass plate is placed in ice-water for 2 hours and the membrane so obtained is stripped off from the plate. The membrane is then immersed in a 5% aqueous solution of the 1:2 chromium complex of the dye of the formula

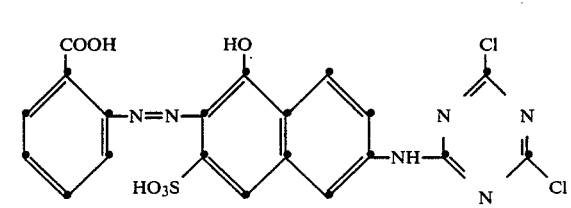

and kept in this solution for 48 hours at pH 6 and a temperature of 25° C. The pH of the dye solution is then adjusted to 10.4 with sodium hydroxide and the solution is continuously agitated for 2 hours at 25° C.

Instead of the treating the membrane in two steps with the dye solution, it is also possible to treat it in a single step for 2½ hours at pH 10.5 and 25° C. with a 10% solution of the chromium complex dye. For the subsequent heat treatment (tempering), the membrane is put for 10 minutes into water of 60° C. The preparation of further suitable membranes is described in the remaining Examples of U.S. Pat. No. 4,247,401.

B. According to Example 1 of U.K. published patent application 2 058 798:

A membrane suitable for ultrafiltration having a maximum pore diameter of 115 Å and based on an acrylonitrile/vinyl acetate copolymer (85:15) and having the following reaction capacity:

2% sodium chloride solution 6%
1% sodium sulfate solution 10%
dextrin (mol. wt. 70,000) 60%
1% solution of the dye of the
formula (4) 34%

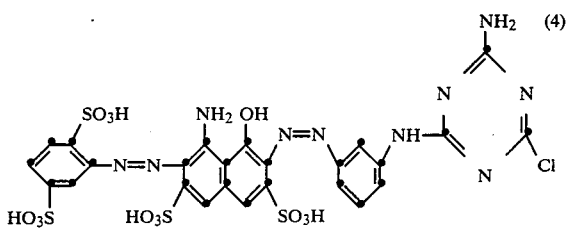

is treated for 5 minutes at 65° C. with an aqueous solution containing 10% of hydroxylamine and 7.5% of sodium carbonate and having a pH of 6.5. The membrane is then removed from the solution and put into a stirred solution of 370 mg of cyanuric chloride per 100 mg of membrane. This solution is kept at pH 10 for 30 minutes at 0° C. by the addition of 1N sodium hydroxide solution. The membrane is removed from this solution, washed with ice-water and put into a stirred 10% solution of polyethyleneimine (mol. wt. 40,000) and kept therein for 5 minutes at room temperature and pH 10. The membrane is removed from this solution and brought into contact with a solution which contains 4% of the dye of the formula

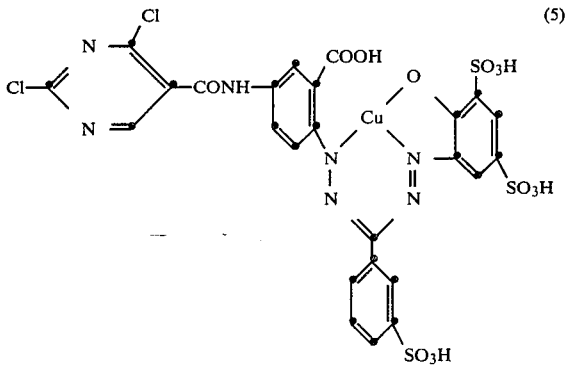

and 10% of sodium chloride, and kept in this solution for 15 minutes at room temperature. The membrane is then put into a 5% solution of sodium carbonate and kept therein for 30 minutes at room temperature. After this treatment, the rate of flow and the retention capacity of the membrane for different dyes, salts and complexes is determined.

The preparation of further suitable membranes is described in the remaining Examples of U.K. published patent specification 2 058 798.

C. According to Example 1 of European published patent application 26 399; A cellulose acetate member (acetyl content 38.9%) having the following specifications:
  molecular weight of dextrin (95% retention): 2000
  maximum working pressure: 13 bar
  pore diameter: 13 Å
  retention capacity for a 2% solution of
    the dye of the formula (4): 82%
    NaCl: 4.5%
    $Na_2SO_4$: 15%
  rate of flow of a 2% solution of the dye of the formula (4): 55 l/m².h
is modified as follows:

The membrane is treated for 15 minutes with a 5% solution of sodium bicarbonate and then for 2 hours with a 2% petroleum ether solution (boiling point: 80°–100° C.) of cyanuric chloride. After the treated membrane has been rinsed with cold water, it is put into a 20% polyethyleneimine solution (molecular weight 189), which has been adjusted to pH 9 with sodium hydroxide, and kept in this solution for 2 hours at 40° C. The membrane is then washed with water for 2 hours. It is then immersed in a solution which contains 5% of the reactive dye of the formula (5), 10% of sodium chloride and sufficient sodium carbonate to bring the pH to 10.5, and kept in this solution for 2 hours at room temperature. The membrane is subsequently tested for its retention capacity and the rate of flow.

The preparation of further suitable membranes is described in the remaining Examples of European published patent application 26 399.

EXAMPLE 1

In a pilot plant for reverse osmosis, the crude synthesis solution of $ZnPc(SO_3Na)_{c.4}$ (ZnPC=zinc phthalocyanine ring system), which has a solids content of about 13%, is passed through a modified cellulose acetate membrane (obtained e.g. in accordance with Preparatory Example A or C above) having a surface area of 0.25 m², under 25 bar overpressure, and concentrated for 6 hours while adding water in the same amount as the initial volume. A concentrated photoactivator solution which contains, in addition to water,
  24.6% of $ZnPc(SO_3Na)_{c.4'}$
  <0.1% of NaCl,
  0.3% of $Na_2SO_4$ and
  0.4% of inorganic byproducts
is obtained. The so obtained photoactivator solution is thus substantially free from troublesome impurities. The solution (liquid formulation) is storage stable and does not gel even on standing for a prolonged period of time.

p It is also possible to use a membrane according to Preparatory Example B or any other membrane defined in this specification.

EXAMPLE 2

Following the procedure described in Example 1, a crude synthesis solution of $AlPcCl(SO_3Na)_{3-4}$ (AlPc=aluminium phthalocyanine ring system) is purified and concentrated by reverse osmosis using a modified membrane. The concentrated, non-gelling, storage-stage formulation of $AlPcCl(SO_3Na)_{3-4}$ so obtained contains byproducts in amounts similar to those in Example 1.

The liquid formulations obtained by the process of the invention can be further processed in conventional manner. For example, they can be added in the appropriate amount, optionally after dilution with water, to the slurry of a washing powder or to liquid detergent compositions.

What is claimed is:

1. A process for preventing the gelating of a concentrated aqueous photoactivator solution containing a sulfonated zinc or aluminum phthalocyanine, which comprises passing a crude solution containing said photoactivator, when preparing said concentrated solutions, through a semipermeable asymmetrical membrane having a pore diameter of 1 to 500 Å and which consists of cellulose acetate which is modified by reaction with an ionic compound which contains hydroxyl-reactive groups, or which consists of polyacrylonitrile or a copolymer of acrylonitrile and another ethylenically unsaturated monomer, and which is modified by reaction with hydroxylamine and subsequent reaction with a polyfunctional monomer selected from the group consisting of cyclic carbonimide halides, isocyanates, isothiocyanates and N-methylol compounds, then a polyfunctional polymer selected from the group consisting of polyethyleneimine, polyvinyl alcohol, polyvinylamine or polyvinyl aniline, and finally with an ionic compound which contains hydroxyl- or amino-reactive groups.

2. A process according to claim 1, wherein the membrane consists of cellulose acetate which is modified by reaction with a polyfunctional monomer selected from the group consisting of cyclic carbonimide halides, isocyanates, isothiocyanates and N-methylol compounds, then a polyfunctional polymer selected from the group consisting of polyethyleneimine, polyvinyl alcohol, polyvinylamine or polyvinyl aniline, and finally with an ionic compound which contains hydroxyl- or amino-reactive groups.

3. A process according to either of claims 1 or 2, wherein the polyfunctional polymer contains aliphatic or aromatic amino groups, hydroxyl, thiol, isocyanate and/or isothiocyanate groups.

4. A process according to either of claims 1 or 2, wherein the membrane contains sulfonic acid, carboxylic acid or ammonium groups as ionic groups.

5. A process according to claim 1, wherein the membrane contains radicals of a water-soluble reactive dye as the ionic compound which contains reactive groups.

6. A process according to claim 1, wherein the basic structure of the membrane contains at least 5% of acrylonitrile units.

7. A process according to claim 6, wherein the basic structure of the membrane contains copolymers of acrylonitrile and vinyl acetate, vinyl ethers, vinyl pyridine, vinyl chloride, styrene, butadiene, acrylic or methacrylic acid, maleic anhydride, 2-aminomethylmethacrylate or allyl compounds or terpolymers or tetrapolymers of acrylonitrile.

8. A process according to claim 1, which comprises the use of a sulfonated zinc or aluminum phthalocyanine of the formula

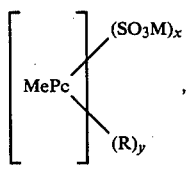

wherein MePc is the zinc or aluminum phthalocyanine ring system, M is hydrogen, an alkali metal ion or an ammonium ion, R is fluorine, chlorine, bromine or iodine, x is any value from 1.3 to 4 and y is any value from 0 to 4, with the proviso that substituents R in the molecule may be identical or different, or a mixture thereof.

9. A process according to claim 8, which comprises the use of a phthalocyanine of the formula

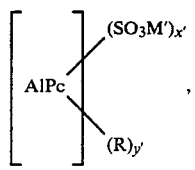

wherein AlPc is the aluminum phthalocyanine ring system, M' is hydrogen, sodium or potassium, x' is any value from 2 to 4 and y' is any value from 0 to 1.5.

10. A process according to claim 8, which comprises the use of a phthalocyanine of the formula

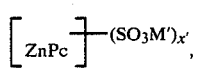

wherein ZnPc is the zinc phthalocyanine ring system, M' is hydrogen, sodium or potassium, and x' is any value from 2 to 4.

11. A non-gelling, concentrated, storage-stable aqueous photoactivator solution obtained according to the process as claimed in claim 1, which solution contains 5 to 50% by weight of a sulfonated aluminum and/or zinc phthalocyanine, of the formula

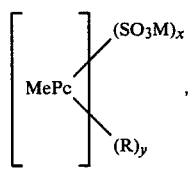

wherein MePc is the zinc or aluminum phthalocyanine ring system, M is hydrogen, an alkali metal ion or an ammonium ion, R is fluorine, chlorine, bromine or iodine, x is any value from 1.3 to 4 and y is any value from 0 to 4, with the proviso that substituents R in the molecule may be identical or different, 0.1 to 1% by weight of netural salts, and 0.1 to 2% by weight of organic by-products.

12. A solution according to claim 11, which contains 10 to 35% by weight of a phthalocyanine photoactivator of claim 11, 0.01 to 0.2% by weight of NaCl, 0.3 to 0.8% of $Na_2SO_4$ and 0.2 to 1% by weight of organic byproducts.

13. A solution according to claim 11, which contains a phthalocyanine of the formula

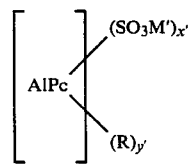

wherein AlPc is the aluminum phthalocyanine ring system, M' is hydrogen, sodium or potassium, x' is any value from 2 to 4 and y' is any value from 0 to 1.5.

14. A solution according to claim 11, which contains a phthalocyanine of the formula

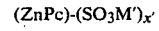

wherein ZnPc is the zinc phthalocyanine ring system, M' is hydrogen, sodium or potassium, and x' is any value from 2 to 4.

* * * * *